United States Patent
Ganesan et al.

(10) Patent No.: US 12,317,233 B2
(45) Date of Patent: May 27, 2025

(54) DETERMINING A RESOURCE FOR A CHANNEL STATE INFORMATION REPORT

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Ravi Kuchibhotla, Chicago, IL (US); Joachim Loehr, Wiesbaden (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 17/613,468

(22) PCT Filed: Nov. 6, 2020

(86) PCT No.: PCT/IB2020/060439
§ 371 (c)(1),
(2) Date: Nov. 22, 2021

(87) PCT Pub. No.: WO2021/090248
PCT Pub. Date: May 14, 2021

(65) Prior Publication Data
US 2022/0225290 A1   Jul. 14, 2022

Related U.S. Application Data

(60) Provisional application No. 62/931,598, filed on Nov. 6, 2019.

(51) Int. Cl.
*H04W 72/02* (2009.01)
*H04W 72/542* (2023.01)
(Continued)

(52) U.S. Cl.
CPC ......... *H04W 72/02* (2013.01); *H04W 72/542* (2023.01); *H04W 72/56* (2023.01); *H04W 72/563* (2023.01); *H04W 80/02* (2013.01)

(58) Field of Classification Search
CPC ... H04W 72/02; H04W 72/542; H04W 72/56; H04W 72/563; H04W 80/02;
(Continued)

(56) References Cited

U.S. PATENT DOCUMENTS

2020/0022089 A1*  1/2020  Guo .................. H04W 24/08
2020/0220669 A1   7/2020  Park
(Continued)

FOREIGN PATENT DOCUMENTS

CN      107733499 A      2/2018
CN      107852219 A      3/2018
WO   WO-2021030565 A1 *  2/2021   ........... H04L 1/0026

OTHER PUBLICATIONS

PCT/IB2020/060439, "Notification of Transmittal of the International Search Report and the Written Opinion of the International Searching Authority, or the Declaration", ISA, Jan. 29, 2021, pp. 1-15.
(Continued)

*Primary Examiner* — Thai Nguyen
(74) *Attorney, Agent, or Firm* — Kunzler Bean & Adamson

(57) ABSTRACT

Apparatuses, methods, and systems are disclosed for determining a resource for a channel state information report. One method (600) includes receiving (602), from a transmitter device, a channel state information reference signal within a data region and a channel state information request indicator in sidelink control information. The method (600) includes determining (604), at a receiver device, a resource for transmitting a channel state information report in
(Continued)

response to the channel state information request indicator using a mode 1 resource allocation procedure, a mode 2 resource allocation procedure, or a combination thereof. The method (600) includes transmitting (606), from the receiver device, the channel state information report via a medium access control control element using the resource.

20 Claims, 6 Drawing Sheets

(51) Int. Cl.
*H04W 72/56* (2023.01)
*H04W 72/563* (2023.01)
*H04W 80/02* (2009.01)

(58) Field of Classification Search
CPC ... H04W 72/04; H04W 72/12; H04W 84/005; H04W 24/10; H04L 5/0053; H04L 5/0057; H04L 5/0064; H04L 5/005; H04L 1/1812; H04B 17/309; H04B 7/0632
See application file for complete search history.

(56) References Cited

U.S. PATENT DOCUMENTS

| | | | |
|---|---|---|---|
| 2021/0068196 A1* | 3/2021 | Akkarakaran | H04W 80/02 |
| 2021/0083820 A1* | 3/2021 | Gulati | H04L 5/0057 |
| 2021/0288778 A1 | 9/2021 | Park | |
| 2022/0116996 A1 | 4/2022 | Lee et al. | |

OTHER PUBLICATIONS

LG Electronics, "[Draft] LS on signalling of sidelink RSRP and CSI between UEs", 3GPP TSG RAN WG1 #98bis R1-1911662, Oct. 14-20, 2019, pp. 1-2.
RAN1, "LS on signalling of sidelink RSRP and CSI between UEs", 3GPP TSG RAN WG1 #98bis R1-1911698, Oct. 14-20, 2019, pp. 1-2.
3GPP, "3rd Generation Partnership Project; Technical Specification Group Radio Access Network; NR; Medium Access Control (MAC) protocol specification (Release 15)", 3GPP TS 38.321 V15.7.0, Nov. 2019, pp. 1-78.
3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0, Nov. 2019, pp. 1-134.
Samsung, On Physical Layer Procedures for NR V2X, 3GPP TSG RAN WG1 #98 R1-1908481, Aug. 26-30, 2019, pp. 1-20.
Ericsson, Phy layer procedures for NR sidelink, 3GPP TSG-RAN WG1 Meeting #98bis R1-1910538, Oct. 14-20, 2019, pp. 1-14.
Huawei, Hisilicon, Sidelink physical layer procedures for NR V2X, 3GPP TSG RAN WG1 Meeting #98bis R1-1910059, Oct. 14-20, 2019, pp. 1-30.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.0.0, Nov. 2019, pp. 1-49.

* cited by examiner

400

| 402 | 426 |
| 404 | 426 |
| 406 | 426 |
| 408 | 426 |
| 410 | 426 |
| 412 | 426 |
| 414 | 426 |
| 416 | 426 |
| 418, 420 | 428 |
| 422, 424 | 428 |

| 502, 504 | 528 |
| --- | --- |
| 506, 508 | 528 |
| 510, 512 | 528 |
| 514, 516 | 528 |
| 518, 520 | 528 |
| 522, 524 | 528 |

FIG. 5

DETERMINING A RESOURCE FOR A CHANNEL STATE INFORMATION REPORT

CROSS-REFERENCE TO RELATED APPLICATIONS

This application claims priority to U.S. Patent Application Ser. No. 62/931,598 entitled "APPARATUSES, METHODS, AND SYSTEMS FOR CONFIGURATION OF TX/RX RESOURCE POOL FOR SIDELINK V2X" and filed on Nov. 6, 2019 for Karthikeyan Ganesan, which is incorporated herein by reference in its entirety.

FIELD

The subject matter disclosed herein relates generally to wireless communications and more particularly relates to determining a resource for a channel state information report.

BACKGROUND

The following abbreviations are herewith defined, at least some of which are referred to within the following description: Third Generation Partnership Project ("3GPP"), $5^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Blind Retransmission ("BR"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Radio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiplexing ("CDM"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclic Prefix Orthogonal Frequency Division Multiplex ("CP-OFDM"), Cyclical Redundancy Check ("CRC"), Channel State Information ("CSI"), Channel State Information-Reference Signal ("CSI-RS"), Common Search Space ("CSS"), Control Resource Set ("CORE-SET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Hybrid Automatic Repeat Request Positive-Acknowledgment ("HARQ-ACK"), HARQ Feedback ("HF"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Intelligent Transportation Systems Application Identifier ("ITS-AID"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Medium Access Control Control Element ("MAC CE"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Out of Coverage ("OOC"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Packet Delay Budget ("PDB"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Broadcast Channel ("PSBCH"), Physical Sidelink Control Channel ("PSCCH"), Primary Secondary Cell ("PS-Cell"), Physical Sidelink Feedback Control Channel ("PSFCH"), Provider Service Identifier ("PSID"), Physical Sidelink Shared Channel ("PSSCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element ("RE"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Resource Pool ("RP"), Reference Signal ("RS"), Road Side Unit ("RSU"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Receiver User Equipment ("RX UE"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Bandwidth Part ("SLBWP"), Sidelink Hybrid Automatic Repeat Request ("SL-HARQ"), Sidelink Radio Bearer ("SLRB"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Transmitter User Equipment ("TX UE"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, CSI may be reported.

BRIEF SUMMARY

Methods for determining a resource for a channel state information report are disclosed. Apparatuses and systems also perform the functions of the methods. One embodiment of a method includes receiving, from a transmitter device, a channel state information reference signal within a data region and a channel state information request indicator in sidelink control information. In some embodiments, the method includes determining, at a receiver device, a resource for transmitting a channel state information report in response to the channel state information request indicator using a mode 1 resource allocation procedure, a mode 2 resource allocation procedure, or a combination thereof. In certain embodiments, the method includes transmitting, from the receiver device, the channel state information report via a medium access control control element using the resource.

One apparatus for determining a resource for a channel state information report includes a receiver device. In certain embodiments, the apparatus includes a receiver that receives, from a transmitter device, a channel state information reference signal within a data region and a channel state information request indicator in sidelink control information. In various embodiments, the apparatus includes a processor that determines a resource for transmitting a channel state information report in response to the channel state information request indicator using a mode 1 resource allocation procedure, a mode 2 resource allocation procedure, or a combination thereof. In some embodiments, the apparatus includes a transmitter that transmits the channel state information report via a medium access control control element using the resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of RX UE allocation;

FIG. 5 is a diagram illustrating another embodiment of RX UE allocation; and

DETAILED DESCRIPTION

Figure 1:
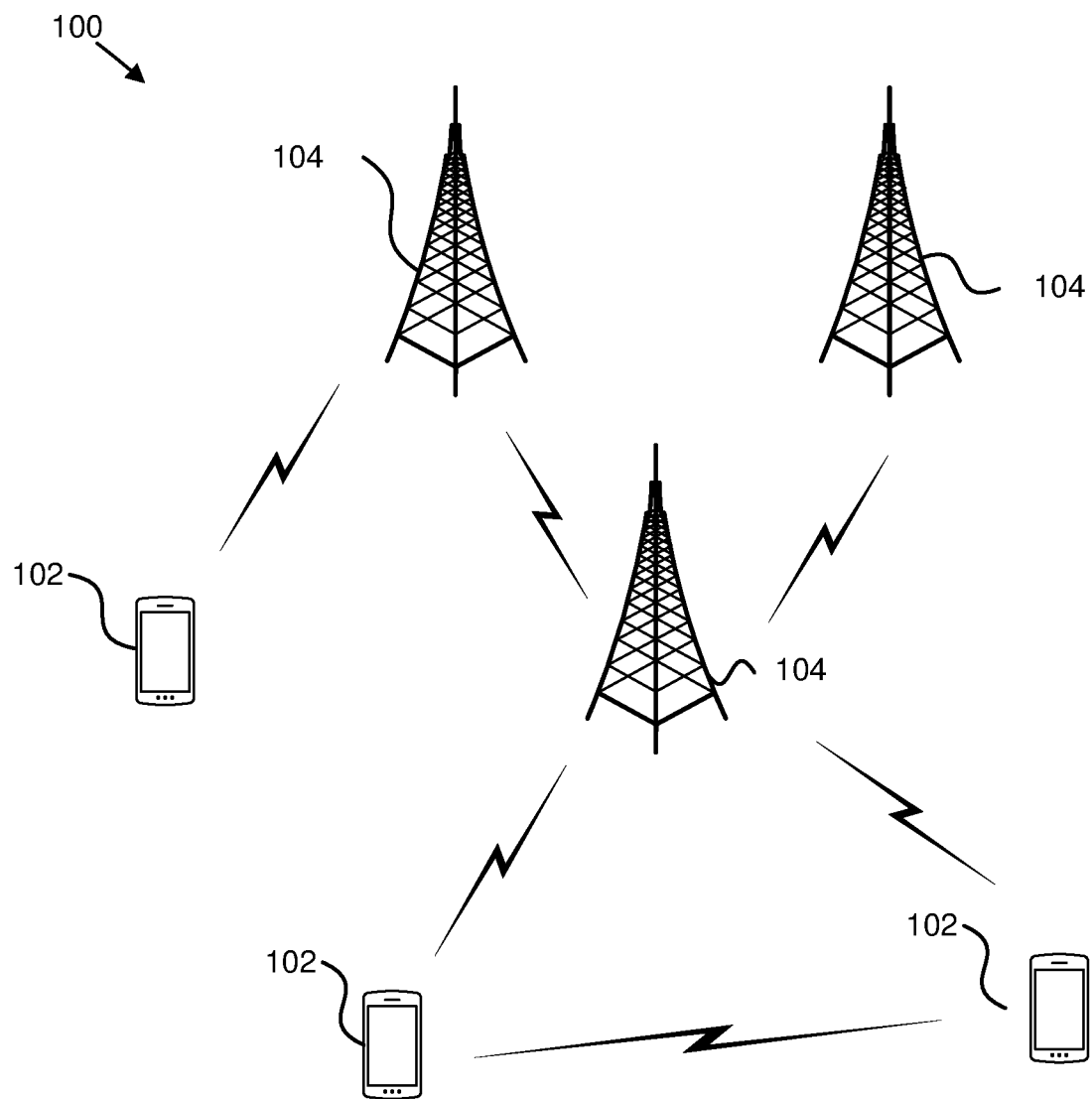
FIG. 1 is a schematic block diagram illustrating one embodiment of a wireless communication system for determining a resource for a channel state information report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a resource for a channel state information report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, from a transmitter device (e.g., network unit 104, remote unit 102), a channel state information reference signal within a data region and a channel state information request indicator in sidelink control information. In some embodiments, the remote unit 102 may determine, at a receiver device (e.g., remote unit 102), a resource for transmitting a channel state information report in response to the channel state information request indicator using a mode 1 resource allocation procedure, a mode 2 resource allocation procedure, or a combination thereof. In certain embodiments, the remote unit 102 may transmit, from the receiver device, the channel state information report via a medium access control control element using the resource. Accordingly, the remote unit 102 may be used for determining a resource for a channel state information report.

Figure 2:
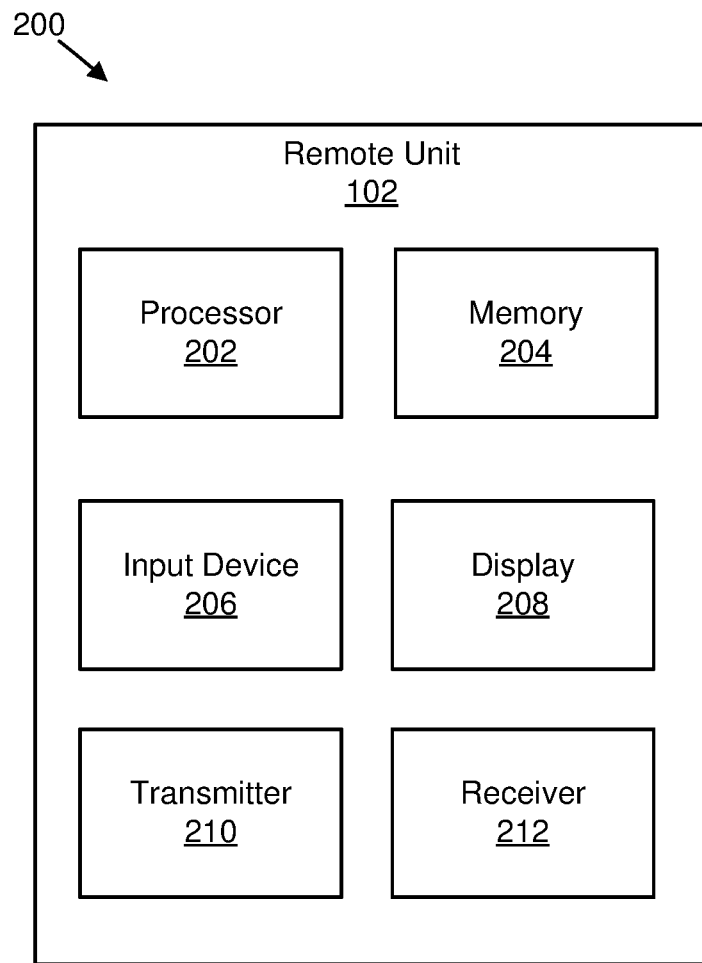
FIG. 2 is a schematic block diagram illustrating one embodiment of an apparatus that may be used for determining a resource for a channel state information report.

FIG. 2 depicts one embodiment of an apparatus 200 that may be used for determining a resource for a channel state information report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the II) touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The receiver 212 may receive, from a transmitter device, a channel state information reference signal within a data region and a channel state information request indicator in sidelink control information. In various embodiments, the processor 202 may determine a resource for transmitting a channel state information report in response to the channel state information request indicator using a mode 1 resource allocation procedure, a mode 2 resource allocation procedure, or a combination thereof. In some embodiments, the transmitter 210 may transmit the channel state information report via a medium access control control element using the resource.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
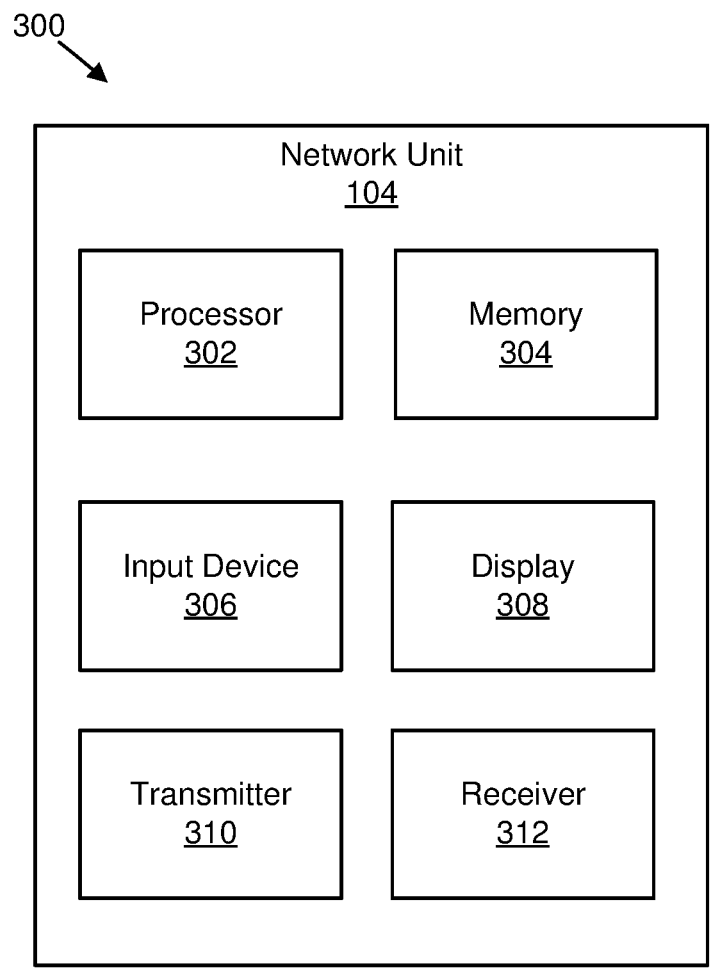
FIG. 3 is a schematic block diagram illustrating one embodiment of an apparatus that may be used for determining a resource for a channel state information report.

FIG. 3 depicts one embodiment of an apparatus 300 that may be used for determining a resource for a channel state information report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, NR SL supports multiple TX resource pools and each of the TX resource pools may be mapped to a QoS. In such embodiments, a TX UE may select one of the multiple TX resource pools for transmission. The selected TX resource pool may be signaled by a gNB, configured, and/or preconfigured. In certain embodiments, an RX pool may contain a list of TX pools to be monitored as part of a sensing procedure and/or configuration for the RX pool may be signaled by a BS, configured, and/or preconfigured.

In some embodiments, parameters such as a sub-channel size, PSFCH resources for SL-HARQ feedback, and/or an MCS table for SL transmission may be configured based on a resource pool priority.

In various embodiments, an out of coverage UE may use a preconfigured RX pool for reception and/or a preconfigured TX pool for transmission. In such embodiments, preconfigurations may be operator dependent and, therefore, not all out of coverage UEs may be configured with an in-coverage RX pool and/or TX pool for receiving and/or transmitting data. As used herein a TX pool may refer to a TX resource pool, a TX resource pool may refer to a TX pool, an RX pool may refer to an RX resource pool, and/or an RX resource pool may refer to an RX pool.

In certain embodiments, communication between an in-coverage UE and out of coverage UEs may be important within a known or common resource pool because a TX UE selects a transmission resource from a TX pool and RX UEs monitor from reception pools. In such embodiments, if TX and/or RX pools are different, then communication between in-coverage and out of coverage UEs may not be possible. Therefore, an out of coverage UE may take into account one or more TX pool configuration and/or RX pool configuration (e.g., sub-channel size, 1st stage SCI size, 1st SCI symbol length in a resource pool, and so forth) to communicate with in-coverage UEs.

In some embodiments, details of a configuration of a 1st stage SCI transmitting via PSCCH may be taken into account for reliability information of a data channel. Therefore, 1st SCI aggregation level may be different taking into consideration reliability information of the data channel. As may be appreciated, because a V2X UE already decodes SCI as part of a sensing related measurement procedure, having different aggregation levels on a 1st stage may not be possible for proper operation.

In various embodiments, a V2X-UE decodes SCI to perform a sensing related measurement and/or resource selection. Therefore, the V2X-UE decodes SCI from different resource pools per slot (e.g., same BWP or different BWP). In such embodiments, a number of times SCI decoding may be performed may be limited per slot and/or the number of times SCI decoding may be performed may depend on a UE capability. The V2X-UE may exclude a time-slot from a candidate resource selection process in which the V2X-UE transmitted information.

As used herein, the term eNB and/or gNB may be used for a base station but it may be replaceable by any other radio access node (e.g., BS, eNB, gNB, AP, NR, and so forth). Further, as may be appreciated, embodiments described herein may be described in the context of 5G NR, but may be applicable to other mobile communication systems supporting serving cells and/or carriers being configured for sidelink communication over a PC5 interface.

Embodiments described herein relate to various configurations, such as for parameters for TX resource pools and/or RX resource pools, such as: 1) configuring one of the TX resource pools and/or RX resource pools via PSBCH by a sync Ref UE or a relay UE to facilitate communication between in-coverage and out of coverage UEs; 2) a reliability of a 1st stage SCI with an AL configured per RP to avoid blind decoding in a sub-channel of a RP; 3) a SCI decoding priority (e.g., as part of sensing) based on a TX pool priority and/or an RX pool priority; and/or 4) FDM+CDMed mapping of PSFCH resource for groupcast option-2 and/or a TX pool configuration and/or RX Pool configuration on the mapping and/or TX-UE behavior.

In a first embodiment, a TX pool configuration and/or an RX pool configuration may be signaled because some V2X UEs may be out of coverage and/or may have partial coverage and may communicate with in-coverage V2X UEs (e.g., including V2X UEs belonging to different MNOs).

In one embodiment, a V2X UE configured as a sync ref UE (e.g., providing synchronization signal and other related system information to out of coverage UEs) may carry in PSBCH information related to at-least one TX resource pool configuration and/or RX resource pool configuration (e.g., sub-channel size, 1st stage SCI's (transmitted via PSCCH) aggregation level, start symbol for PSCCH in a slot, start frequency resource for PSCCH within a sub-channel, symbol length for PSCCH, total number of occupied RBs, and/or size of 1st stage SCI). In such an embodiment, a TX resource pool and/or RX resource pool may be a common resource pool for communication between in-coverage or out of coverage UEs and may be used for unicast, groupcast, and/or broadcast transmission. The information carried in PSBCH may help out of coverage UEs to monitor or receive PSCCH from the common resource pool which may help in initiating a PC5 RRC connection for unicast, groupcast, and/or broadcast transmission. After establishing a connection in the common resource pool, PC5 RRC may carry information related to other dedicated TX resource pools and/or RX resource pools (e.g., dedicated resource pool associated with a QoS priority).

In another embodiment, a discovery transmission (e.g., an L3 signal or an L1 signal transmitted using a common resource pool) carries a TX resource pool configuration and/or an RX resource pool configuration related to a dedicated resource pool.

In certain embodiments, one or more parameters associated with a resource pool configuration (e.g., such as a sub-channel size) may be implicitly conveyed with SLSS. In such embodiments, an SSID (e.g., SLSS ID) may implicitly inform information indicating a sub-channel size. This may be similar to indicating in-coverage or out of coverage in a SLSS transmission via a SLSS ID selection.

In various embodiments, different transmission resources (e.g., time and/or frequency domain) of SLSS may be configured to represent a sub-channel size.

In some embodiments, a UE configured as a relay UE (e.g., by a gNB or an eNB) may transmit TX pool and/or RX pool related configuration information in PSBCH (e.g., relay Sidelink SIB related information) or in a discovery message.

In certain embodiments, a decoding reliability of a 1st stage SCI may meet a corresponding PSSCH reliability and multiple resource pools may be configured in a system to meet various reliability requirements so that a 1st stage SCI size varies for different RPs. In such embodiments, a gNB may configure (per TX resource pools and/or RX resource pools) a 1st stage SCI's (e.g., transmitted via PSCCH) aggregation level, a start symbol for PSCCH in a slot, a start frequency resource for PSCCH within a sub-channel, a symbol length for PSCCH, a repetition of 1st SCI transmission, a total number of occupied RBs, and/or a size of 1st stage SCI. Therefore, in such embodiments, a V2X-UE from a configuration of the TX resource pool and/or RX resource pool may know the 1st SCI aggregation level, SCI size, and so forth, and/or may perform SCI decoding without blind decoding to know a transmitted AL.

In various embodiments, due to a limited processing capability of a SL-UE in terms of SCI decoding of 1st stage SCI per slot, some SCI decoding as part of a sensing mechanism may be dropped per slot and the SL-UE may not perform proper sensing related measurements for resource pools. In such embodiments, an SCI decoding priority for sensing related measurements per slot may take into account a priority of a TX resource pool and/or an RX resource pool. For each slot, SCI decoding of high priority TX and/or RX RPs may happen first compared to SCI decoding of low priority RPs. Such embodiments may be configured by a gNB, a configuration, and/or a preconfiguration. In such embodiments, the TX resource pools and/or the RX resource pools may be configured with: 1) FDM only mapping of PSFCH resources for groupcast option-2; or 2) FDM+CDM mapping of PSFCH resources for groupcast option-2 for the same PSSCH transmission and the corresponding UE behavior on the determination of an index of a PSFCH resource for a PSFCH transmission in response to a PSSCH reception which could be FDM+CDMed mapping of PSFCH resources. This mapping of PSFCH for groupcast option-2 may also be configured per TX resource pool and/or RX resource pool. In certain embodiments, a TX resource pool and/or RX resource pool with a high priority may enable FDMed mapping of PSFCH resources while a low priority may use CDMed or FDM+CDM mapping of PSFCH resource. In certain embodiments FDM refers to the frequency domain allocation of the PSFCH resource and CDM refers to the cyclic shift applied to the sequence transmitted in the PSFCH resource.

In some embodiments, for a UE behavior on the determination of an index of a PSFCH resource for a PSFCH transmission in response to a PSSCH reception which could be FDM+CDMed of PSFCH if there are not enough frequency resources for groupcast option-2, each RX UE may be allocated with a dedicated feedback resource containing FDMed and CDMed resource.

In one embodiment, as shown in FIG. 4, the determination of an index of a PSFCH resource for a PSFCH transmission may be based first on a frequency (first on the frequency refers to the first lowest PRB in a subchannel), and, if there are not enough frequency resources, then based on cyclical shift of a sequence (first cyclic shift value from the configured list of cyclic shift pairs). In FIG. 4, 12 UEs are allocated within 10 RBs, 8 UEs PSFCH resources are allocated in a frequency domain first and then 4 UEs PSFCH resources are allocated in the code domain. This may degrade the performance of some UEs allocated in the code domain compared with UEs allocated in the frequency domain due to a near-far effect.

FIG. 4 is a diagram illustrating one embodiment of UE allocation 400. Specifically, the allocation 400 is for a first UE 402, a second UE 404, a third UE 406, a fourth UE 408, a fifth UE 410, a sixth UE 412, a seventh UE 414, an eighth UE 416, a ninth UE 418, a tenth UE 420, an eleventh UE 422, and a twelfth UE 424. The first UE 402, the second UE 404, the third UE 406, the fourth UE 408, the fifth UE 410, the sixth UE 412, the seventh UE 414, and the eighth UE 416 are each allocated with their own individual PSFCH resource 426 (e.g., one UE on each of the FDM resources). The ninth UE 418, the tenth UE 420, the eleventh UE 422, and the twelfth UE 424 are collocated so that the ninth UE 418 and the tenth UE 420 have a shared PSFCH resource 428 (e.g., CDM of 2 UEs in the frequency resource), and the eleventh UE 422 and the twelfth UE 424 have a shared PSFCH resource 428 (e.g., CDM of 2 UEs in the frequency resource).

In another embodiment, as shown in FIG. 5, UE behavior on the determination of an index of a PSFCH resource for a PSFCH transmission in response to a PSSCH reception which could be FDMed and CDMed resources equally. Specifically, in one example, 12 UEs are allocated within 6 RBs. As may be appreciated, a number of CDM users per frequency resource may be determined by dividing a number of available frequencies by a number of receivers in a group. In such an embodiment, a base sequence of PSFCH Format 0 for a TX UE may be determined by a gNB, configured, and/or pre-configured based on a source ID or destination group ID, and the determination of the value of a cyclic shift (e.g., feedback resource) may be determined based on an internal member ID in a group (e.g., source ID and/or configured internal member ID by higher layer).

FIG. 5 is a diagram illustrating another embodiment of UE allocation 500. Specifically, the allocation 500 is for a first UE 502, a second UE 504, a third UE 506, a fourth UE 508, a fifth UE 510, a sixth UE 512, a seventh UE 514, an eighth UE 516, a ninth UE 518, a tenth UE 520, an eleventh UE 522, and a twelfth UE 524. The first UE 502, the second UE 504, the third UE 506, the fourth UE 508, the fifth UE 510, the sixth UE 512, the seventh UE 514, the eighth UE 516, the ninth UE 518, the tenth UE 520, the eleventh UE 522, and the twelfth UE 524 are collocated so that the first UE 502 and the second UE 504 have a shared PSFCH resource 528 (e.g., CDM of 2 UEs in the frequency resource), the third UE 506 and the fourth UE 508 have a shared PSFCH resource 528 (e.g., CDM of 2 UEs in the frequency resource), the fifth UE 510 and the sixth UE 512 have a shared PSFCH resource 528 (e.g., CDM of 2 UEs in the frequency resource), the seventh UE 514 and the eighth UE 516 have a shared PSFCH resource 528 (e.g., CDM of 2 UEs in the frequency resource), the ninth UE 518 and the tenth UE 520 have a shared PSFCH resource 528 (e.g., CDM of 2 UEs in the frequency resource), and the eleventh UE 522 and the twelfth UE 524 have a shared PSFCH resource 528 (e.g., CDM of 2 UEs in the frequency resource).

In some embodiments, multiple TX resource pools and/or RX resource pools may be configured in a system SL BWP and/or one or more SL BWP may be configured in one carrier or adjacent carriers. In certain embodiments, a system level gNB configuration or preconfiguration continuously configures and/or allocates RP identifiers within a SL BWP and/or SL carrier. In various embodiments, RP identifiers are continuously configured and/or allocated within and/or across multiple SL BWPs and/or SL Carriers.

In some embodiments, a Mode-1 SL grant from a gNB may specify a SL BWP ID along with a time and/or frequency resource. In other embodiments, a Mode-1 SL grant from a gNB may specify a time and/or frequency resource for transmission along with a resource pool identifier.

In certain embodiments, SL BWPs, RPs, or SL carriers may be associated with more than one traffic priority, an SR resource may be considered per TX resource pool and/or RX resource pool, a TX-UE may select a TX resource pool for transmission, and/or the TX-UE may request a gNB for SL grant by transmitting a SR associated with a certain RP. In various embodiments, a multi bit SR configuration may be transmitted by a TX-UE if an RP identifier is part of the multi bit SR.

In certain embodiments, a 2nd SCI mapping in a resource pool may depend on a sub-channel size, a reliability of a 2nd SCI transmission associated with a SL data transmission, and/or a mapping of the 2nd SCI with PSSCH may be performed if more than one layer PSSCH transmission is enabled. In some embodiments, a 2nd SCI is transmitted with PSCCH but transmitted within the PSSCH resource.

In one embodiment, a 2nd SCI may span more than one sub-channel and/or may occupy less than or equal to a PSSCH. In various embodiments, a 2nd SCI may be repeated within a PSSCH resource to increase reliability if the repetition is configured by a 1st SCI and/or configured or configured per TX resource pool and/or RX resource pool.

In another embodiment, if a UE is enabled with two layer transmission for PSSCH, a 2nd SCI may overlap with a PSSCH transmission in a slot. For example, a 2nd SCI payload may be mapped to one layer and PSSCH data may be mapped to another layer. The 2nd SCI payload that is mapped to one layer may be repeatedly transmitted in that layer for reliability purpose. In non-overlapped symbols in a slot, PSSCH may be transmitted with two layers.

In various embodiments, if a UE is enabled with four-layer transmission for PSSCH, a 2nd SCI may overlap with a PSSCH transmission in a slot. For example, a 2nd SCI payload may be mapped to two or more layers and the PSSCH data may be mapped to the rest of the layers. The 2nd SCI payload's same modulation symbols may be mapped to one or more layers or different modulation symbols may be mapped in two or more layers.

In certain embodiments, a UE receiver may know which layers are mapped with 2nd SCI and PSSCH data. An indication of the mapping may be part of 1st stage SCI, configured per resource pool based on layers, and/or pre-configured per resource pool based on layers.

In some embodiments if a UE maps the same modulation symbols of 2nd SCI in all supported layers of a UE, reliability may be enhanced due to a transmit diversity transmission scheme. In certain embodiments, if different modulation symbols of 2nd SCI are in all supported layers of a UE, throughput may be enhanced. In various embodiments, a 2nd SCI may be spatially multiplexed with PSSCH in an overlapped portion. In some embodiments, a 2nd SCI may be mapped scrambled and channel coded along with PSSCH. In such an embodiment, a mapping method used for 2nd SCI and PSSCH data transmission may be dynamically signaled in the 1st SCI, configured per resource pool, preconfigured per resource pool, or signaled to a BS by a SL UE.

In certain embodiments, because overlapped portion contain both a 2nd SCI payload and a PSSCH data payload, a TB size of data in one or more layers in the overlapped portion of a slot may be affected by the presence of 2nd SCI and, therefore, the TB size of PSSCH may be different for different PSSCH layers. In various embodiments, a SL UE may puncture data for a 2nd SCI in one or more layers if the 2nd SCI is mapped instead of PSSCH data or a BS may provide a grant for a TB size for each supported layer of a SL-UE.

Although various embodiments described herein correspond to spatial multiplexing of a 2nd SCI and PSSCH as one mapping method, mapping of 2nd SCI with PSSCH using a NOMA scheme may be possible if the 2nd SCI and PSSCH use different codes.

In some embodiments, such as from a RAN-1 perspective, a SL HARQ feedback resource may be configured per TX resource pool and/or per RX resource pool, may be enabled per TX/RX resource pool, and/or may be disabled per TX/RX resource pool.

In some embodiments, a maximum number of blind transmissions (or retransmissions) may be configured per TX resource pool and/or RX resource pool and may be restricted based on channel busy ratio measurements.

In one embodiment, RAN2 may support SL HARQ feedback enabling and/or disabling and may be configured in an SLRB level: 1) for both mode1 & mode2 UEs: SLRB level may be in an RRC message; and 2) for idle, inactive, and/or OOC UEs: SLRB level may be in an SIB and/or pre-configuration message.

In some embodiments, if a SLRB enables SL HARQ feedback for a TX UE SL data transmission, a NR Mode-1 SL grant does not provide PUCCH resources for reporting SL HARQ ACK/NACK feedback report to a gNB. In such embodiments, the TX-UE may request SL-HARQ ACK/NACK feedback from RX UEs either using various embodiments in SCI. Since there is no PUCCH resource for reporting SL HARQ ACK/NACK feedback to the gNB, then transmission (or retransmission) for that TB and/or HARQ process ID may be triggered with an NR Mode 2 operation. Furthermore, in such embodiments, candidate resource selection by the TX UE for the transmission (or retransmission) may be within a remaining PDB. In various embodiments, if PUCCH resources are not signaled by a gNB in DCI providing a SL grant, a TX UE selects only LCHs (e.g., SLRBs) that are not configured to seek HARQ feedback (e.g., disabled HARQ feedback) by the gNB or that are not required to seek HARQ feedback based on the TX UE assessment of corresponding QoS parameters (e.g., latency, reliability requirements, etc.).

In certain embodiments, if SL HARQ feedback is disabled (e.g., corresponding SLRBs are not configured to seek HARQ feedback) for all LCHs for which data is available for transmission and an NR Mode-1 SL grant provides a PUCCH resource, then a TX UE may not seek SL HARQ feedback from RX UEs for groupcast and/or unicast transmission in SCI. The TX UE may report SL HARQ-ACK in the PUCCH resource.

In a second embodiment, if SL HARQ feedback is enabled for SLRBs (e.g., LCHs that are part of a MAC TB after an LCP procedure) for a TX UE SL data transmission and the NR Mode-1 SL grant may not provide a PUCCH resource for reporting a SL HARQ ACK/NACK feedback report to a gNB, then the TX UE may not seek SL HARQ-ACK/NACK feedback from RX UEs for groupcast and/or unicast transmission in SCI and may choose to make a certain number of blind retransmissions.

In various embodiments, if a SLRB disables SL HARQ feedback from a TX UE SL data transmission and a gNB provides PUCCH resources for reporting a SL HARQ ACK/NACK feedback report to the gNB, then either the TX UE enables SL HARQ feedback from RX UEs in SCI and reports in the PUCCH resource or the TX UE may choose to not to seek SL HARQ feedback from RX UEs in SCI and reports ACK in the PUCCH resource.

In some embodiments, such as for unicast and/or groupcast, a network may configure a HARQ enable and/or disable for a TX-UE as follows: 1) for RRC_CONNECTED UEs: a gNB may make a configuration via an RRC message; 2) for RRC_Idle and/or RRC_Inactive UEs: the gNB may make a configuration via an SIB; and/or 3) for OOC UEs: the gNB may make a configuration via a preconfiguration.

In certain embodiments, such as for RAN2, to support SL HARQ feedback enable and/or disable configuration in a SLRB level: 1) for both mode1 & mode2 UEs: SLRB level may be configured in an RRC message; and/or 2) for Idle, Inactive, and/or OOC UEs: SLRB level may be configured in an SIB and/or preconfiguration message.

In various embodiments, if strictly followed, a remaining grant may not be occupied since there are no more LCHs that have the same configuration and/or restriction with regards to HARQ feedback enable and/or disable, but there may be LCHs that have data available for transmission and may be a different configuration and/or restriction with regards to HARQ feedback enable and/or disable for the same destination.

In some embodiments, a complete transmitter UE behavior for Mode 1 and Mode 2 V2X communication may be missing.

In certain embodiments, it may be better to maximize data transmission rather than use padding. In such embodiments, this may be possible if a remaining grant is occupied by LCHs not requiring feedback (LCHs already occupying this grant may not need HARQ feedback). Further, in such embodiments, if there is some remaining grant available and no other LCH with available data has HARQ feedback disabled, padding may be used.

In various embodiments, padding may be used if it is determined that HARQ feedback is not to be sought, there is some remaining grant available, and no other LCH with available data has HARQ feedback disabled.

In some embodiments, data from highest priority LCHs that have HARQ feedback disabled may be included instead of padding if it is determined that HARQ feedback is to be sought and there is some remaining grant available but no more LCHs with available data have HARQ feedback enabled.

Two possible embodiments of transmitter UE behavior are described in a first alternative embodiment and a second alternative embodiment.

In a first alternative embodiment, the following steps may be performed:

In a first step of the first alternative embodiment, an LCP procedure is run—catering to a highest priority destination and/or LCHs. The highest priority destination may be a destination corresponding to a highest priority logical channel for which data is available for transmission. A selected destination LCP is run on all LCHs that have data available for transmission irrespective of whether HARQ feedback is enabled for disabled for a corresponding LCH.

In a second step of the first alternative embodiment, it is determined whether blind retransmissions ("BR") are used. BR may be useful if a PDB (e.g., highest priority logical channel included) is small (e.g., there is not much room for HARQ feedback based retransmission) and a reliability required is high. A TX MAC may decide whether to use BR based on: 1) latency (e.g., derived from PQI) or remaining PDB such that the remaining PDB may not allow for more than 1 (or a certain number) transmission (or retransmission)—keeping in mind a subcarrier spacing in use for PSCCH, PSSCH, and PSFCH, or, if PQI has certain specified, configured, and/or preconfigured values; and/or 2) whether reliability (e.g., of a highest priority logical channel included) is higher than a certain threshold, or if PQI has certain specified, configured, and/or preconfigured values.

Channel condition, CBR, and/or group size may be taken into account while determining a BR requirement. For a big group, it might be more sensible to use BR if a probability that one UE or another UE may require retransmission is higher than that of a smaller group. In a congested channel (e.g., CBR higher than a certain threshold), it may be sensible to avoid BR if latency or remaining PDB is sufficient to allow for certain retransmissions. If the TX UE determines that blind retransmissions needs to be made, the TX UE may set a variable BR Needed to TRUE and go to a fourth step of the first alternative embodiment directly. Determination of blind transmission (or retransmission) may be made for an initial transmission as well as for retransmission of a TB.

In a third step of the first alternative embodiment, there may be an HF and HF Option determination. If there is at least one LCH with HF enabled (e.g., based on an RRC configuration or preconfiguration for an OOC UE), the TX UE sets a variable HF_Needed to TRUE, else to FALSE.

If the HF_Needed variable is set to TRUE, the TX UE checks whether there are a sufficient amount of PSFCH resources available for Option_2 based HARQ feedback (Option_2 feedback may be HARQ feedback based on a dedicated ACK and NACK resource provided to each UE). If yes, set the HF_OPTION to Option_2; Else, set the HF_OPTION to Option_1 (Option_1 feedback may be HARQ feedback based on a common NACK resource).

In a fourth step of the first alternative embodiment, an MCR may be selected. As one option, this may be an MCR corresponding to a highest priority logical channel; or, as another option, this may be a highest MCR corresponding to any logical channel that is part of the TB.

In a fifth step of the first alternative embodiment, the following items may be indicated to a physical layer while submitting a MAC TB: 1) variables HF_Needed, HF_OPTION, or variable BR Needed; and/or 2) MCR.

In a sixth step of the first alternative embodiment, the TX UE sends a 2 bits indication in PSCCH to receiver UEs with one of the following content depending on what MAC signaled to the physical layer: 00—blind retransmission (e.g., assuming a number of blind retransmissions is known to the receiver using a specification, an upper layer configuration, and/or a preconfiguration); 01—HF_OPTION_1; 10—HF_OPTION_2; and/or 11—no further transmission of the corresponding PSSCH is to be made—the receiver can clear its soft buffer after attempting to decode a corresponding PSSCH.

If a number of blind retransmissions is not known to the receiver, this may need to be dynamically signaled in the PSCCH. There are alternatives to do that and one way may be to use a separate indication for signaling the number of blind retransmissions. In certain embodiments, two bits may be used as follows: 00—'x' blind retransmission; 01—HF_OPTION_1; 10—HF_OPTION_2; and/or 11—'y' blind retransmission.

In a seventh step of the first alternative embodiment, the TX UE makes a transmission (e.g., PSCCH followed by PSSCH) to receiver UEs. If feedback is sought, the TX UE waits and collects all feedback. If a retransmission is required, the TX UE indicates NACK to a gNB if PUCCH resources were granted; else (e.g., mode2 based transmission or no PUCCH resources were granted), the TX UE initiates resource selection for retransmission or uses a reserved resource retransmission. If PUCCH resources were granted but the TX UE did not seek HARQ feedback, the TX UE may indicate ACK to the gNB.

The first alternative embodiment may have the benefit that it caters to a highest priority destination and allocates a grant in a priority order for a selected destination. Moreover, the first alternative embodiment may cause PUCCH resources to go wasted if a TX UE does not seek feedback from receivers because of blind retransmissions or no LCH with HARQ feedback is included. An ACK may be signaled in PUCCH indicating to a gNB that no more retransmission is required (e.g., and that DCI was successfully received by the TX UE).

In a second alternative embodiment, the following steps may be performed:

In a first step of the second alternative embodiment, a determination of HARQ feedback needed is made to check if a HARQ feedback is to be sought for a next transmission (e.g., before running LCP). This determination may be based on: 1) for Mode 1—explicit or implicit signaling in Mode 1 SL Grant (e.g., DCI). Implicit signaling may be based on the inclusion of PUCCH resources in DCI for sending HF back to a gNB. Therefore, whether HARQ feedback is to be requested by a TX UE is based on a network recommendation for the same. Next, the TX UE selects a destination corresponding to a highest priority logical channel that has data available for transmission and has the same HARQ feedback restriction and/or configuration (e.g., HF enabled or disabled) as recommended by the DCI providing a SL grant; 2) for Mode1 as well as Mode2—the TX UE determination of whether the highest priority destination (e.g., destination corresponding to the highest priority logical channel for which data is available for transmission) requires HF or not. This may be used in Mode 1 as well if DCI can't signal this (e.g., from a specification perspective, if no provision is made in DCI signaling to indicate if a TX UE should seek feedback).

In a second step of the second alternative embodiment, an LCP procedure is run—for LCP only the logical channels may be considered that have HF enabled or disabled, as the case may be from the first step of the second alternative embodiment for the selected destination.

Determination of if blind retransmissions, HF_OPTION, MCR, the fifth step of the first alternative embodiment, the sixth step of the first alternative embodiment, and the seventh step of the first alternative embodiment may be similarly performed in the second alternative embodiment.

The second alternative embodiment may not waste PUCCH resources unless a TX UE determines to perform blind retransmissions. Moreover, the second alternative embodiment may not cater to a highest priority destination and may not allocate a grant in a priority order for a selected destination.

In certain embodiments, such as for CQI and/or RI reporting on a PSSCH: 1) higher layer signaling (e.g., MAC CE) may be used for CQI and/or RI reporting; and/or 2) a SL CQI and/or RI measurement and derivation may be based on a physical layer procedure for Uu (e.g., Uu may refer to an LTE radio interface that enables data transfer between an eNB and UEs).

In some embodiments, sidelink CSI-RS may be supported for CQI and/or RI measurement. In various embodiments, sidelink CSI-RS may be confined within a PSSCH transmission.

As used herein, Option_1 may refer to the following: in the first embodiment 1) PC5 RRC based SL-CSI (e.g., CQI and/or RI value) reporting may be used and a PC5 RRC message may be defined for SL-CSI reporting; 2) the PC5 RRC message may be associated with a SL-SRB configuration that is specified, configured, or preconfigured; 3) the SL-SRB may be configured with either mode-1 and/or mode-2 transmission and corresponding HARQ feedback option may be enabled or disabled, and may be specified, configured, or preconfigured; 4) a priority value (e.g., PQI and/or PDB value) may be associated with the SLRB carrying a SL-CSI report and a gNB may separately configure an SR resource for this SLRB; 5) if a UE measures CSI-RS and generates a SL-CSI report with a CQI and/or RI value to be transmitted, the UE may trigger SR transmission to request a resource from the gNB for this purpose; 6) for Mode-2 transmission, a candidate resource may be selected for transmission within the PDB (e.g., the UE selects a T2 value for candidate resource selection based on and corresponding to a PQI defined for the SL-SRB) and indicate the same in a QoS priority field in SCI.

As used herein, Option_2 may refer to the following: 1) the MAC-CE is defined for carrying an SL-CSI value based on a physical layer measurements; 2) in the first embodiment, the MAC-CE is generated only if there is SL data to be transmitted and the MAC-CE is multiplexed with the SL data transmission in a TB and the priority of transmitting the MAC-CE is same as that of the SL data transmission; and/or 3) in the second embodiment, the MAC-CE is generated immediately without SL data and a TB is generated for the PHY layer only containing MAC-CE—the MAC-CE is associated with certain priority (e.g., PQI value and/or PDB)—the MAC-CE itself triggers a SL resource selection or reselection mechanism for Mode-2—the MAC-CE may be configured with mode-1 and/or mode-2 transmission and the corresponding HARQ feedback option may be enabled or disabled, and accordingly specified, configured, or preconfigured—for mode-1, separate SR resources may be configured by a gNB for the MAC-CE carrying SL-CSI to all SL-UEs—the MAC-CE may trigger an SR requesting resource from the gNB for Mode-1 SL grant—the MAC-CE may be configured with SL-HARQ enabled or not, blind transmission (or retransmission), and a number of blind transmissions (or retransmissions)—the number of blind retransmissions may be the same or different compared with that of SL data transmission—the LCP procedure for transmitting the MAC-CE for SL-CSI reporting may be based on a defined priority value (e.g., PQI value)—a generated TB containing the MAC-CE may include a source ID of a received CSI-RS transmission (e.g., the L2 source ID of the TX-UE unicast session that transmitted the CSI-RS or requested a SL-CSI report)—a mode-2 candidate resource selection and/or transmission procedure may take into account a PDB value of the MAC-CE (e.g., the TX-UE selects a T2 value for candidate resource selection based on a priority value defined for the MAC-CE) and may indicate the PDB value in a QoS priority field in SCI.

In various embodiments, a SL-CSI ageing issue may be addressed for Option_1 and/or Option_2. In such embodiments, a UE starts and/or restarts a timer whenever it receives a CSI-RS transmission or SL-CSI reporting request and the UE finds a candidate resource for transmission within a time window corresponding to the timer. If the timer expires and if there is no SL resource selected or available for transmission then a MAC-CE is not transmitted. The timer may be restarted if a CSI-RS is received or a SL-CSI measurement is received from lower layers. In certain embodiments, as long as a CSI report is considered pending for transmission (e.g., pending flag defined), a UE generates a SL-CSI report based on a latest CSI-RS transmission received from the same source. The pending flag may be cleared or cancelled if a SL-CSI report is transmitted.

In some embodiments, an RX-UE may include a time-slot number in a radio frame if a CSI report is generated and a TX UE may choose to accept or ignore the report from the RX-UE.

Figure 6:
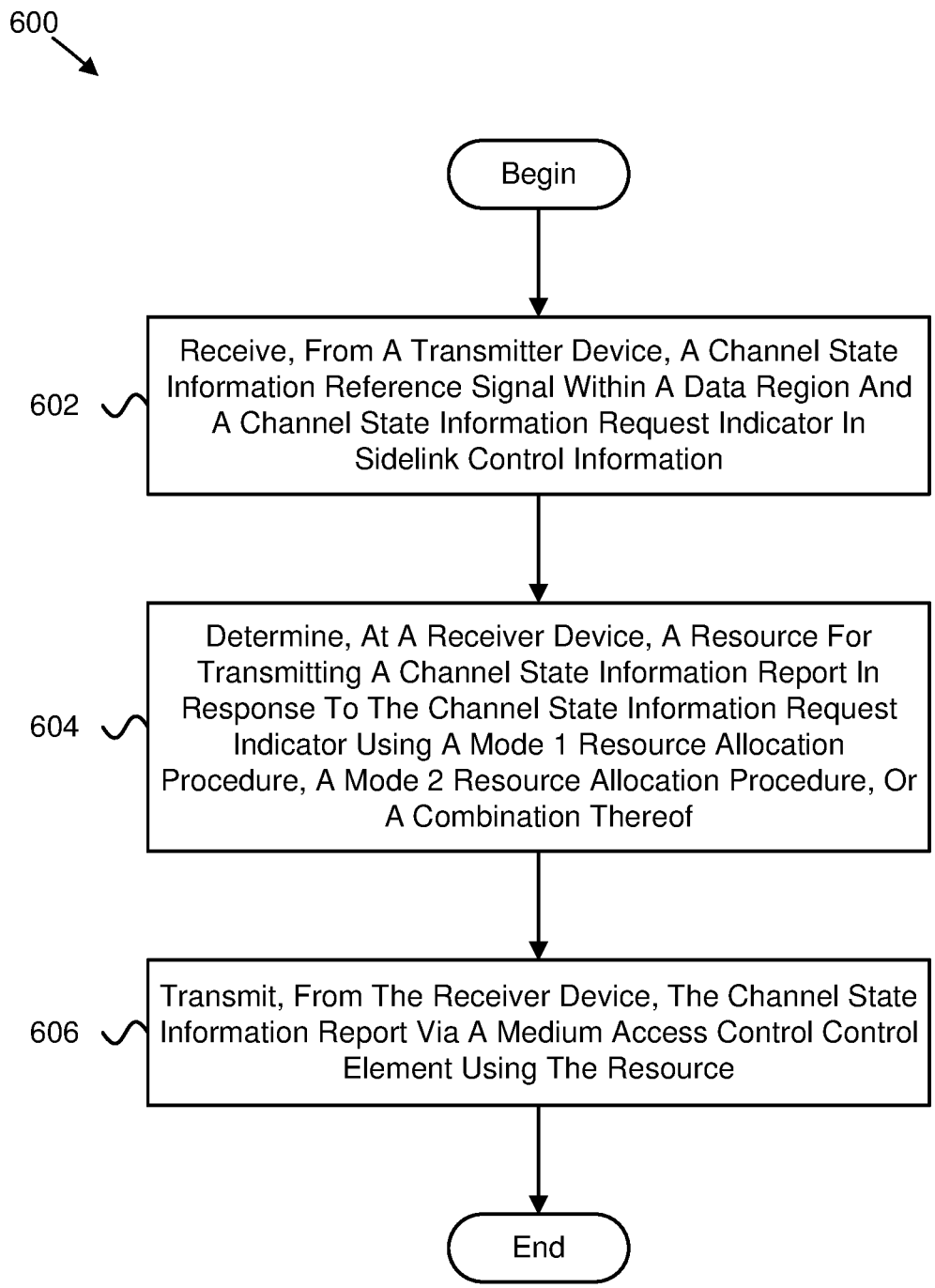
FIG. 6 is a flow chart diagram illustrating one embodiment of a method for determining a resource for a channel state information report.

FIG. 6 is a flow chart diagram illustrating one embodiment of a method 600 for determining a resource for a channel state information report. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, from a transmitter device (e.g., remote unit 102), a channel state information reference signal within a data region and a channel state information request indicator in sidelink control information. In some embodiments, the method 600 includes determining 604, at a receiver device (e.g., remote unit 102), a resource for transmitting a channel state information report in response to the channel state information request indicator using a mode 1 resource allocation procedure, a mode 2 resource allocation procedure, or a combination thereof. In certain embodiments, the method 600 includes transmitting 606, from the receiver device, the channel state information report via a medium access control control element using the resource.

In certain embodiments, the channel state information report is a sidelink channel state information report comprising a channel quality indicator and a rank indicator. In some embodiments, the method 600 further comprises, in response to transmitting the channel state information report, configuring a latency bound packet delay budget and a priority value for the transmission of a sidelink channel state information report by the sidelink medium access control control element for a source-destination pair. In various embodiments, transmission of the sidelink channel state information report by the medium access control control element is triggered by an indication from a lower layer.

In one embodiment, a medium access control starts a sidelink channel state information report timer based on the trigger for the sidelink channel state information report, and a duration of the sidelink channel state information report timer is configured based on the latency bound packet delay budget. In certain embodiments, the method 600 further comprises performing logical channel prioritization for the transmission of the sidelink channel state information report according to the latency bound packet delay budget and the priority value. In some embodiments, the method 600 further comprises stopping the sidelink channel state information report timer and canceling the trigger for the trigger for the sidelink channel state information report after successful transmission of the trigger for the sidelink channel state information report.

In various embodiments, the method 600 further comprises canceling the trigger for the sidelink channel state information report if the latency bound packet delay budget has been exceeded prior to transmission of the sidelink channel state information report after expiration of the sidelink channel state information report timer. In one embodiment, the channel state information report is transmitted by a MAC CE using a physical sidelink shared channel and a priority of transmitting the MAC CE containing SL CSI is indicated in the sidelink control information, and in the certain embodiment priority of the MAC CE (medium access control control element) is defined in the specification. In certain embodiments, for the mode 1 resource allocation procedure, separate scheduling request resources are configured for the transmission of the medium access control control element carrying SL CSI, and a scheduling request to request the resource from a network device may be triggered by a MAC CE carrying sidelink channel state information report.

In some embodiments, for the mode 2 resource allocation procedure, a resource reselection procedure is triggered by a medium access control to determine the resource according to a latency bound packet delay budget and a priority value for the transmission of a sidelink channel state information report. In various embodiments, in response to the medium access control control element being multiplexed with data, sidelink hybrid automatic repeat request feedback is enabled based on a logical channel configuration.

In one embodiment, in response to the medium access control control element not being multiplexed with data, sidelink hybrid automatic repeat request feedback is disabled. In certain embodiments, a packet delay budget value corresponds to a medium access control control element carrying SL CSI reports may be configured by PC5 RRC configuration.

In one embodiment, a method comprises: receiving, from a transmitter device, a channel state information reference signal within a data region and a channel state information request indicator in sidelink control information; determining, at a receiver device, a resource for transmitting a channel state information report in response to the channel state information request indicator using a mode 1 resource allocation procedure, a mode 2 resource allocation procedure, or a combination thereof; and transmitting, from the receiver device, the channel state information report via a medium access control control element using the resource.

In certain embodiments, the channel state information report is a sidelink channel state information report comprising a channel quality indicator and a rank indicator.

In some embodiments, the method further comprises, in response to transmitting the channel state information report, configuring a latency bound packet delay budget by PC5 RRC and a priority value for the transmission of a sidelink channel state information report by the medium access control control element for a source-destination pair is defined in the specification.

In various embodiments, transmission of the sidelink channel state information report by the medium access control control element is triggered by an indication from a lower layer and in one example, the trigger is transmitted by sidelink control information ("SCI").

In one embodiment, a medium access control starts a sidelink channel state information report timer based on the trigger for the sidelink channel state information report, and a duration of the sidelink channel state information report timer is configured based on the latency bound packet delay budget.

In certain embodiments, the method further comprises performing logical channel prioritization for the transmission of the sidelink channel state information report according to the latency bound packet delay budget and the priority value.

In some embodiments, the method further comprises stopping the sidelink channel state information report timer and canceling the event trigger for the sidelink channel state information report after successful transmission of the sidelink channel state information report.

In various embodiments, the method further comprises canceling the event trigger for the sidelink channel state information report if the latency bound packet delay budget has been exceeded prior to transmission of the sidelink channel state information report after expiration of the sidelink channel state information report timer.

In one embodiment, the channel state information report is transmitted by a physical sidelink shared channel and a priority is indicated in the sidelink control information, and the priority indicated in the sidelink control information is based on a priority of the medium access control control element.

In certain embodiments, for the mode 1 resource allocation procedure, separate scheduling request resources are configured for the transmission of the medium access control control element, and a scheduling request to request the resource from a network device is triggered by a sidelink channel state information report.

In some embodiments, for the mode 2 resource allocation procedure, a resource reselection procedure is triggered by a medium access control to determine the resource according to a latency bound packet delay budget and a priority value for the transmission of a sidelink channel state information report.

In various embodiments, in response to the medium access control control element being multiplexed with data, sidelink hybrid automatic repeat request feedback is enabled based on a logical channel configuration.

In one embodiment, in response to the medium access control control element not being multiplexed with data, sidelink hybrid automatic repeat request feedback is disabled.

In certain embodiments, a packet delay budget value corresponds to a medium access control control element carrying a SL CSI report.

In one embodiment, an apparatus comprising a receiver device. The apparatus further comprises: a receiver that receives, from a transmitter device, a channel state information reference signal within a data region and a channel state information request indicator in sidelink control information; a processor that determines a resource for transmitting a channel state information report in response to the channel state information request indicator using a mode 1 resource allocation procedure, a mode 2 resource allocation procedure, or a combination thereof; and a transmitter that transmits the channel state information report via a medium access control control element using the resource.

In certain embodiments, the channel state information report is a sidelink channel state information report comprising a channel quality indicator and a rank indicator.

In some embodiments, the processor, in response to transmitting the channel state information report, configures a latency bound packet delay budget and a priority value for the transmission of a sidelink channel state information report by the medium access control control element for a source-destination pair.

In various embodiments, event trigger for the transmission of the sidelink channel state information report at the medium access control control element is triggered by an indication from a lower layer.

In one embodiment, a medium access control starts a sidelink channel state information report timer based on the trigger for the sidelink channel state information report, and a duration of the sidelink channel state information report timer is configured based on the latency bound packet delay budget.

In certain embodiments, the processor performs logical channel prioritization for the transmission of the sidelink channel state information report according to the latency bound packet delay budget and the priority value.

In some embodiments, the processor stops the sidelink channel state information report timer and cancels the event trigger of the sidelink channel state information report after successful transmission of the sidelink channel state information report.

In various embodiments, the processor cancels the trigger event for the sidelink channel state information report if the latency bound packet delay budget has been exceeded prior to transmission of the sidelink channel state information report after expiration of the sidelink channel state information report timer.

In one embodiment, the channel state information report is transmitted by a physical sidelink shared channel and a priority is indicated in the sidelink control information, and the priority indicated in the sidelink control information is based on a priority of the medium access control control element.

In certain embodiments, for the mode 1 resource allocation procedure, separate scheduling request resources are configured for the transmission of the medium access control control element, and a scheduling request to request the resource from a network device is triggered by a sidelink channel state information report.

In some embodiments, for the mode 2 resource allocation procedure, a resource reselection procedure is triggered by a medium access control to determine the resource according to a latency bound packet delay budget and a priority value for the transmission of a sidelink channel state information report.

In various embodiments, in response to the medium access control control element being multiplexed with data, sidelink hybrid automatic repeat request feedback is enabled based on a logical channel configuration.

In one embodiment, in response to the medium access control control element not being multiplexed with data, sidelink hybrid automatic repeat request feedback is disabled.

In certain embodiments, a packet delay budget value corresponds to a medium access control control element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment (UE), the method comprising:
- receiving sidelink control information (SCI) comprising a channel state information (CSI) request associated with a CSI reference signal (CSI-RS);
- determining a triggering of a sidelink CSI reporting for a pair of a source identifier (ID) and a destination identifier (ID);
- determining a resource allocation procedure for the sidelink CSI report, the resource allocation procedure comprising a mode 1 resource allocation procedure or a mode 2 resource allocation procedure;
- generating a medium access control-control element (MAC-CE) for the sidelink CSI report based at least in part on the resource allocation procedure; and transmitting the sidelink CSI report via the MAC-CE based at least in part on one or more of the CSI request, or the resource allocation procedure, or the triggering of the sidelink CSI reporting.

2. The method of claim 1, wherein the sidelink CSI report comprises a channel quality indicator (CQI) and a rank indicator (RI).

3. The method of claim 1, further comprising:
determining a latency bound packet delay budget associated with the sidelink CSI report or a priority report,
wherein transmitting the sidelink CSI report is based at least in part on the latency bound packet delay budget associated with the sidelink CSI report or a priority associated with the sidelink CSI report.

4. The method of claim 3, further comprising:
starting a sidelink CSI report timer based at least in part on the triggering of the sidelink CSI reporting,
wherein a duration of the sidelink CSI report timer is configured based at least in part on the latency bound packet delay budget.

5. The method of claim 3, further comprising:
performing logical channel prioritization transmitting the sidelink CSI report according to one or more of the latency bound packet delay budget associated with the sidelink CSI report or the priority associated with the sidelink CSI report.

6. The method of claim 4, further comprising:
stopping the sidelink CSI report timer; and
canceling the sidelink CSI reporting.

7. The method of claim 4, further comprising:
canceling triggered sidelink CSI reporting, based at least in part on the latency bound packet delay budget being satisfied prior to transmitting of the sidelink CSI report, after expiration of the sidelink CSI report timer.

8. The method of claim 1, wherein transmitting the sidelink CSI report comprises:
transmitting the sidelink CSI report on a physical sidelink shared channel (PSSCH),
wherein the SCI includes an indication of a priority associated with the sidelink CSI report.

9. The method of claim 1, wherein the mode 1 resource allocation procedure corresponds to one or more separate scheduling request (SR) resources configured for requesting resources for the sidelink CSI report.

10. The method of claim 1, wherein the mode 2 resource allocation procedure corresponds to a resource reselection being triggered to determine the resource allocation procedure according to a latency bound packet delay budget and a priority value associated with the sidelink CSI report.

11. The method of claim 1, wherein the SCI indicates whether sidelink hybrid automatic repeat request (HARQ) feedback is enabled or disabled.

12. The method of claim 1, wherein a packet delay budget value corresponds to the MAC-CE.

13. The method of claim 1, further comprising defining a sidelink CSI report timer associated with the sidelink CSI report, wherein a value of the sidelink CSI report timer is based on a latency bound packet delay budget.

14. The method of claim 13, further comprising starting the sidelink CSI report timer based on the sidelink CSI reporting.

15. A user equipment (UE), comprising:
at least one memory; and
at least one processor coupled with the at least one memory and configured to cause the UE to:
receive sidelink control information (SCI) comprising a channel state information (CSI) request associated with a channel state information reference signal (CSI-RS);
determine a triggering of a sidelink CSI reporting for a pair of a source identifier (ID) and a destination identifier (ID);
determine a resource allocation procedure for the sidelink CSI report, the resource allocation procedure comprising a mode 1 resource allocation procedure, or a mode 2 resource allocation procedure;
generate a medium access control-control element (MAC-CE) for the sidelink CSI report based at least in part on the resource allocation procedure; and
transmit the sidelink CSI report via the MAC-CE based at least in part on one or more of the CSI request, the resource allocation procedure, or the triggering of the sidelink CSI reporting.

16. The UE of claim 15, wherein the at least one processor is configured to cause the UE to:
determine a latency bound packet delay budget associated with the sidelink CSI report or a priority associated with the sidelink CSI report.

17. The UE of claim 15, wherein the mode 1 resource allocation procedure corresponds to one or more separate scheduling request (SR) resources configured for requesting resources for the sidelink CSI report.

18. The UE of claim 15, wherein the mode 2 resource allocation procedure corresponds to a resource reselection being triggered to determine the resource allocation procedure according to a latency bound packet delay budget and a priority value associated with the-sidelink CSI report.

19. A method of a base station, the method comprising:
transmitting a configuration for sidelink channel state information (CSI) reporting,
wherein the sidelink CSI reporting is for a pair of a source identifier (ID) and a destination identifier (ID),
wherein the sidelink CSI reporting is based at least in part on a resource allocation procedure comprising a mode 1 resource allocation procedure or a mode 2 resource allocation procedure,
wherein the mode 2 resource allocation procedure corresponds to a trigger for resource reselection, and
wherein the resource allocation procedure is determined according to a latency bound packet delay budget and a priority value associated with the sidelink CSI reporting.

20. A base station for wireless communication, comprising:
at least one memory; and
at least one processor coupled with the at least one memory and configured to cause the base station to:
transmit a configuration for sidelink channel state information (CSI) reporting,
wherein the sidelink CSI reporting is for a pair of a source identifier (ID) and a destination identifier (ID),
wherein the sidelink CSI reporting is based at least in part on a resource allocation procedure comprising a mode 1 resource allocation procedure or a mode 2 resource allocation procedure,
wherein the mode 2 resource allocation procedure corresponds to a trigger for resource reselection, and wherein the resource allocation procedure is determined according to a latency bound packet delay budget and a priority value associated with the sidelink CSI reporting.

* * * * *